US008621354B2

(12) United States Patent
Henderson et al.

(10) Patent No.: US 8,621,354 B2
(45) Date of Patent: Dec. 31, 2013

(54) NON SEQUENTIAL AUTOMATED PRODUCTION BY SELF-INTERVIEW KIT OF A VIDEO BASED ON USER GENERATED MULTIMEDIA CONTENT

(75) Inventors: Russell Henderson, Glasgow (GB); Paul Cameron, Lochwinnoch (GB); Ewan McDougall, Stirling Central (GB); Simon Tricker, Kilcreggan (GB)

(73) Assignee: Russell Henderson, Glasgow (GB)

( * ) Notice: Subject to any disclaimer, the term of this patent is extended or adjusted under 35 U.S.C. 154(b) by 641 days.

(21) Appl. No.: 12/666,439

(22) PCT Filed: Jun. 27, 2008

(86) PCT No.: PCT/GB2008/050513
§ 371 (c)(1),
(2), (4) Date: Sep. 13, 2010

(87) PCT Pub. No.: WO2009/004372
PCT Pub. Date: Jan. 8, 2009

(65) Prior Publication Data
US 2010/0322589 A1    Dec. 23, 2010

Related U.S. Application Data

(60) Provisional application No. 60/929,516, filed on Jun. 29, 2007.

(51) Int. Cl.
*G06F 3/00* (2006.01)
*G11B 27/34* (2006.01)

(52) U.S. Cl.
CPC ..................................... *G11B 27/34* (2013.01)
USPC ............ 715/723; 715/203; 386/239; 386/278

(58) Field of Classification Search
CPC ............................. G11B 27/34; H04N 21/2368
USPC ........... 715/200–202, 203, 723; 386/239, 278
See application file for complete search history.

(56) References Cited

U.S. PATENT DOCUMENTS 6,954,894 B1 * 10/2005 Balnaves et al. .............. 715/202
2002/0109710 A1    8/2002 Holtz et al.

(Continued)

FOREIGN PATENT DOCUMENTS

| EP | 0403118 A2 | 12/1990 |
| KR | 2002 0025132 A | 4/2002 |
| WO | WO-2007/011329 A1 | 1/2007 |

OTHER PUBLICATIONS

Glasser, Jean-Marc, "International Search Report" for PCT/GB2008/050513 as mailed Sep. 22, 2008, 4 pages.

*Primary Examiner* — Thai Tran
*Assistant Examiner* — Mishawn Dunn
(74) *Attorney, Agent, or Firm* — Buchanan Nipper (57) ABSTRACT

A computer (2) is used to prepare a script (4) of prompts for a media capture device (6) such as a cell phone or a self interview kit. Discrete prompts of the script are displayed. A camera (14) then captures video clips or other assets with each video clip corresponding to one or more displayed prompt. A clip storage module (18) stores each recorded video clip in a storage unit (20) so as to be related to its corresponding discrete prompts. The clip to prompt relationship provided by the storage module (18) facilitates the editing of the clips into a sequence to produce a complete video presentation or movie. The final video sequence compilation can be performed automatically using the script to define the order of each clip. The automatically edited video sequence may be ordered non-sequentially with respect to the order of the presentation of the discrete prompts. This reflects the non-sequential filming of scenes in film making to avoid going back and forth between locations, where the final edit assembles the clips in a different order to that in which the filming takes place.

36 Claims, 10 Drawing Sheets

(56) References Cited

U.S. PATENT DOCUMENTS

2004/0230410 A1* 11/2004 Harless et al. .................. 703/6
2006/0008239 A1 1/2006 Huang et al.
2007/0111176 A1 5/2007 Brown

* cited by examiner

NON SEQUENTIAL AUTOMATED PRODUCTION BY SELF-INTERVIEW KIT OF A VIDEO BASED ON USER GENERATED MULTIMEDIA CONTENT

CROSS-REFERENCE TO RELATED APPLICATIONS

This patent application claims the benefit of priority from, and incorporates by reference the entire disclosure of, U.S. Provisional Patent Application No. 60/929,516 filed Jun. 29, 2007.

BACKGROUND OF THE INVENTION

This invention relates to video production, in particular apparatus for the recording of video clips and the editing of video clips into sequences.

The introduction and widespread availability of camera phones, small digital stills & video cameras and web cams has placed the means of video production into the hands of many users who are unskilled in film making and video production. The first people on the scene at large events are no longer news crews but members of the public with their camera phones recording video. Concerts, holidays & live events are all being recorded by the spectators and participants. UGC (User Generated Content) is the name given to this explosion of content by the telecommunications companies.

A first problem is that the UGC does not conform to a structure suitable for video production or filmmaking. For example, an unskilled user will not plan the shooting of video clips to conform to a story. This is because there is no skilled filmmaker or director on hand to prompt them with instructions with reference to a storyboard.

A second problem is that editing of UCG into video sequences is difficult for both the unskilled user and the professional editor.

For editing by the unskilled user, the tools for media editing are available, but are relatively complicated to use. Therefore many unskilled users stick to just recording video clips and do not assemble them into complete sequences such as videos, movies or podcasts.

In relation to editing by a professional editor, professional filmmakers use clapperboards and digital slates to identify scenes and takes during editing, but these tools are not suitable for users generating their own content because of the cost and inconvenience as the extra equipment has to be purchased and carried around. Also in consumer devices with integrated sound and video recording the synchronization function of the clapperboard or digital slate is superfluous. Therefore, the professional editor dealing with UGC does not have the benefit of scene identification information.

Companies have been set up to take a customer's digital media and assemble it into video presentations, but because of the problems discussed above, the editor at the company has to guess how the clips and stills fit together, perhaps just based on the date stamping, and make up their own story. The end result is better than no editing at all, but is still just an edited archive, which has sequences of events that don't make sense to the customer, in part because of the lack of direction during filming and a lack of communication with the editor.

Young people generate much UGC and it would be useful to direct and capture UGC in schools as part of the learning process, but the problems identified above are an obstacle to this. Taking an elementary or primary school as an example:

Traditional video production and editing processes appear to be too complicated and technical and contain too many steps between concept and final screened production, to realistically be used by pupils and teachers on an unsupported and regular basis.

Teachers are very "time pressured" and they have very limited time to learn and practice new skills.

Elementary or primary schools have no onsite technician, and day-to-day technical back up is provided by interested teachers.

Focusing on producing traditional finished discrete "television style programmes" is not the only method of using video and possibly not the most effective use of UGC in this context.

Simply making resources available will not result in the production of UGC.

Solutions are not robust and self contained, interfaces are not simple and transparent and resources do not involve minimal or no set-up.

Elementary or primary teachers use digital stills cameras and photographic print outs a lot. But they use video cameras and UGC playback in the classroom/school very infrequently.

The main reason elementary or primary teachers do not use more technology in the classroom is lack of confidence.

The main concern of teachers using technology in the classroom is that "Technical problems arise which are distracting to the class".

Teachers are very positive about the theoretical advantages of using UGC technology in the classroom.

BRIEF SUMMARY OF THE INVENTION

It is an object of aspect the present invention to provide a media capture apparatus for improved capture and editing of user generated content.

According to a first aspect of the present invention, there is provided a media capture apparatus comprising:

a script storage module adapted to store a script, the script comprising a plurality of discrete prompts;

a script presenting module adapted to present a plurality of discrete prompts to a user;

a media capture module adapted to capture a plurality of prompted media assets, each prompted media asset corresponding to at least one discrete prompt of the plurality of discrete prompts; and an asset storage module adapted to store each captured prompted media asset so as to be related to its corresponding at least one discrete prompt.

Preferably, the media capture module comprises a media recorder adapted to record a plurality of prompted media clips, each prompted media clip corresponding to at least one discrete prompt of the plurality of discrete prompts.

Preferably, the asset storage module comprises a clip storage module adapted to store each recorded prompted media clip so as to be related to its corresponding at least one discrete prompt.

Preferably, the media capture apparatus further comprises a script receiving module adapted to receive the script.

Optionally, the script comprises a questionnaire and the prompts comprise questions.

Preferably, the script presenting module is further adapted to present the plurality of discrete prompts one at a time.

Preferably, the script presenting module is further adapted to present a set of the plurality of discrete prompts at the same time.

Preferably, the media capture module is operable to capture at least one of the plurality of prompted media assets responsive to a user input.

Preferably, the user input comprises the user selecting a prompt from a plurality of presented prompts.

Preferably, the script further comprises a user identifier and the asset storage module is further adapted to store each captured prompted media asset so as to be related to its corresponding user identifier.

Preferably, the user identifier comprises a user name.

Preferably, the user identifier comprises a user group.

Preferably, the media recorder comprises a video camera.

Preferably, the media capture apparatus further comprises an editing module adapted to edit at least some of the captured prompted media assets into a media sequence using the relationship between each captured prompted media asset and its corresponding at least one discrete prompt.

Preferably, the editing module is further adapted to edit at least some of the captured prompted media assets into a media sequence using the user identifier.

Preferably, the editing module is further adapted to automatically edit the captured prompted media assets into a media sequence.

Preferably, the editing module is further adapted to automatically edit the captured prompted media assets into a media sequence that is non-sequential with respect to the order of the presentation of the discrete prompts.

Preferably, the editing module is further to edit the captured prompted media assets from a plurality of the media capture apparatuses into a media sequence.

Preferably, the script further comprises a predefined behaviour.

Preferably, the behaviour is applied to the capture of the prompted captured asset.

Preferably, the behaviour is applied prior to the capture of the prompted captured asset.

Preferably, the behaviour is applied during the capture of the prompted captured asset.

Preferably, the behaviour comprises control of the environment local to the capture.

Preferably, the behaviour comprises control of devices.

Preferably, the behaviour comprises performance coaching.

Preferably, the behaviour is applied to the prompted captured asset.

Preferably, the behaviour is applied to the prompted captured asset after its capture.

Preferably, the behaviour comprises manipulation of the prompted captured asset.

Preferably, the behaviour comprises tagging of the prompted captured asset.

Preferably, the behaviour comprises quality control of the prompted captured asset.

Preferably, the behaviour comprises classification of the prompted captured asset.

Preferably, the behaviour comprises control of the editing by the editing module.

Preferably, the script comprises a template for a movie.

Preferably, the prompt comprises a visual storyboard.

Preferably, the prompt comprises director's audio guidance.

Preferably, the prompt comprises lines of dialogue.

Preferably, the script comprises non-user generated content selected from a list comprising titles, sound effects, narrative, background music and whole scenes.

Preferably, the script comprises a link or pointer to other content.

According to a second aspect of the present invention, there is provided a phone comprising the media capture apparatus of the first aspect.

According to a third aspect of the present invention, there is provided a camera comprising the media capture apparatus of the first aspect.

According to a fourth aspect of the present invention, there is provided a self interview kit comprising the media capture apparatus of the first aspect.

According to a fifth aspect of the present invention, there is provided a computer program comprising program instructions configured to operate a device as the media capture apparatus of the first aspect.

BRIEF DESCRIPTION OF THE DRAWINGS

The present invention will now be described by way of example only with reference to the accompanying Figures, in which.

DETAILED DESCRIPTION OF THE INVENTION

The preferred embodiment of the present invention is a video capture device that uses a script to capture user generated content for use with special editing software that uses the script and captured video to produce a video sequence.

Figure 1:
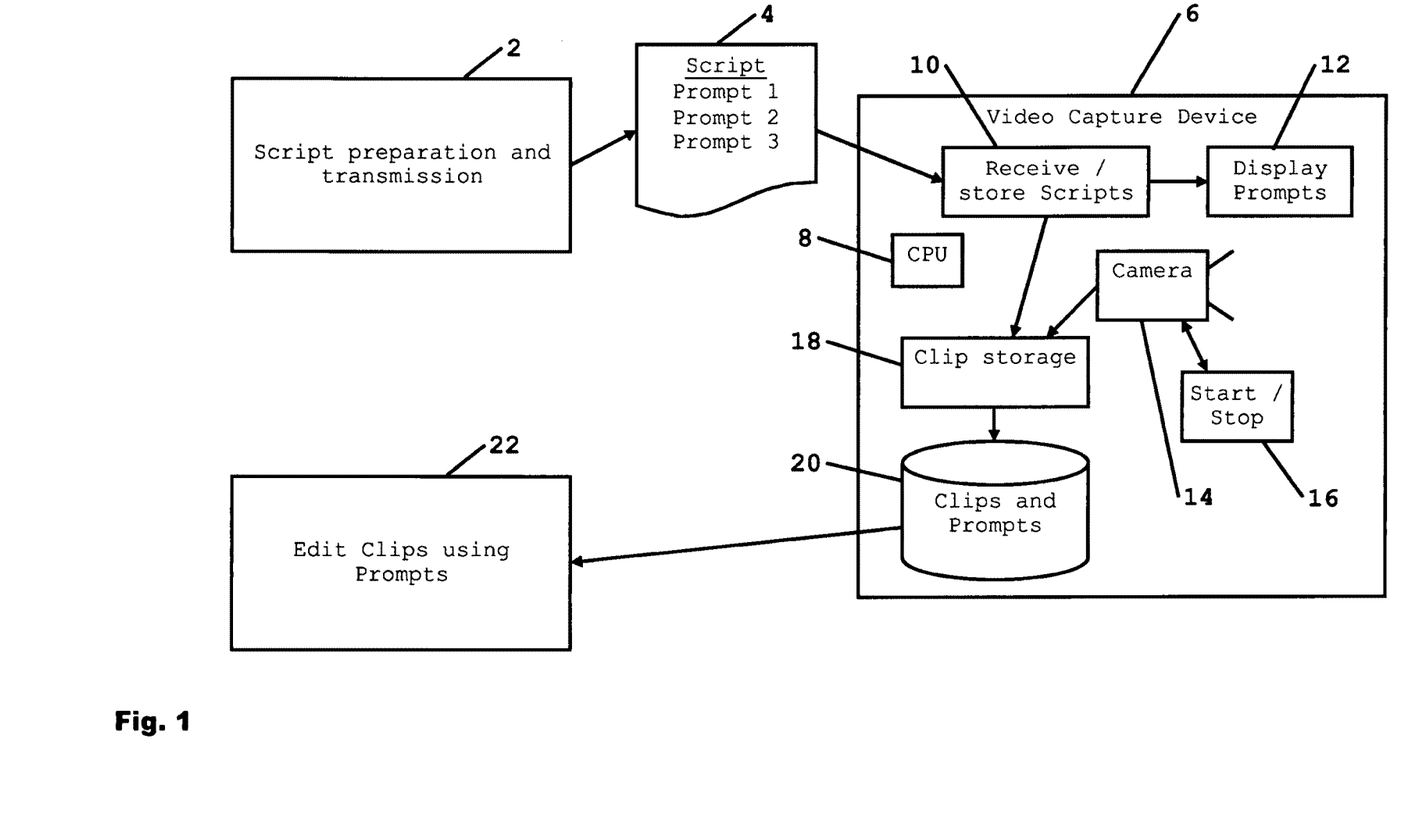
FIG. 1 illustrates, in schematic form, the apparatus in accordance with a preferred embodiment of the present invention.

FIG. 1 shows a preferred embodiment of the present invention. A computer 2 is used with a computer program to prepare a script 4 of prompts. The script 4 is transmitted to the video capture device 6 by conventional means, for example by downloading over the Internet. The video capture device can be for example, a cell phone, a digital camera, or a camcorder. Alternatively, it may be a self interview kit comprising a laptop in a suitcase with a built in or connected web cam. The suitcase can have additional lighting activated during the recording. Optionally, the laptop display can provide lighting during recording, for example by displaying a white screen. The video capture device 6 has a processor 8 that controls the operation of the other components of the device. Here, the processor 8 is a microcontroller that has its own memory for program and data storage.

The script 4 is received by a script receiving and storage module 10. This operates to receive the script via a communication interface and uses memory to store the script. The receiving module is can be omitted in the case of pre-installed scripts. The discrete prompts of the script are displayed on the display 12 one at a time or with a set of them displayed together. Alternatively, the prompts can be presented to the user by other types of user interface, for example by a loudspeaker (not shown). The camera 14 then records the video clips with each video clip corresponding to one or more displayed prompt. The recording can start automatically, after a set time delay, or in response to a user input on the stop/start button 16.

The clip storage module 18 stores each recorded video clip in a storage unit 20, such as flash memory or a hard drive, so as to be related to its corresponding one or more discrete prompt. If the script includes a user identifier, such as a user name or group, the storage module 18 also stores each recorded video clip so as to be related to the user identifier. The prompt, or a prompt identifier may be stored in a database. Alternatively, the prompt may be appended to the video clip, for example as a tag or encoded as video frames concatenated to the start of the clip. The video clips and prompts (or prompt identifiers) are transmitted to a central hub having editing module 22. The hub can receive clips relating to the same script from a number of separate video capture devices. The clip to prompt relationship provided by the storage module 18 facilitates the editing of the clips into a sequence to produce a complete video presentation or movie. The editing module 22 may be integrated in the video capture device. In an alternative embodiment, the final video sequence compilation can be performed automatically using the script to define the order of each clip. The automatically edited video sequence may be ordered non-sequentially with respect to the order of the presentation of the discrete prompts. This reflects the non-sequential filming of scenes in film making to avoid going back and forth between locations, where the final edit assembles the clips in a different order to that in which the filming takes place.

An example use of the apparatus of FIG. 1 is the distribution of a script for a 'one-minute horror movie' to a user's cell phone. The script acts as a template for the movie. Each scene has several prompts giving to the user a visual storyboard, a directors audio guidance and lines of dialogue for the filming of the clip. The script may also include or be transmitted with other non-user generated content, such as titles, sound effects, narrative and background music for editing into the final movie. This other content can include whole scenes. Links or pointers to the other content may be provided to make the template smaller for transmission. When the user has recorded all of the clips and entered their name, the movie is automatically generated, complete with the user's clips, the other content and the credits including their own name. This may be automatically created on the user's cell phone or at a central server which uploads the clips. This example shows how a user with no movie making skills (apart from the ability to shoot a video clip) can quickly and conveniently make a superior short movie with the benefit of screenplay, direction and editing all designed by a professional.

The preferred media for the present invention to record and process is video, although it is well suited to operate with other media including still images, audio, audio/visual, multimedia and biometric data.

With reference to FIGS. 2 to 7, screen grabs of a further embodiment of the apparatus of the present invention are presented below. This embodiment is a self interview kit for use in schools. In this embodiment the script is a questionnaire and the prompts are questions. The video clips are answers to the questions. An alternative use in a school for language teaching would have the prompts asking the pupils to speak phrases in a particular language and the recorded clips would be automatically edited into an entertaining and properly structured conversation to reinforce the learning of the language in context.

Figure 2:
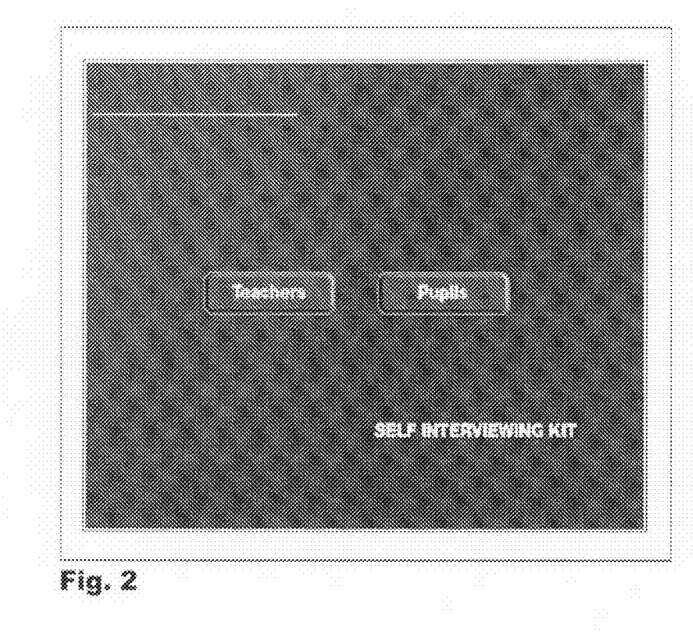
FIG. 2 illustrates a user type selection screen of a self interviewing kit program.
Figure 3:
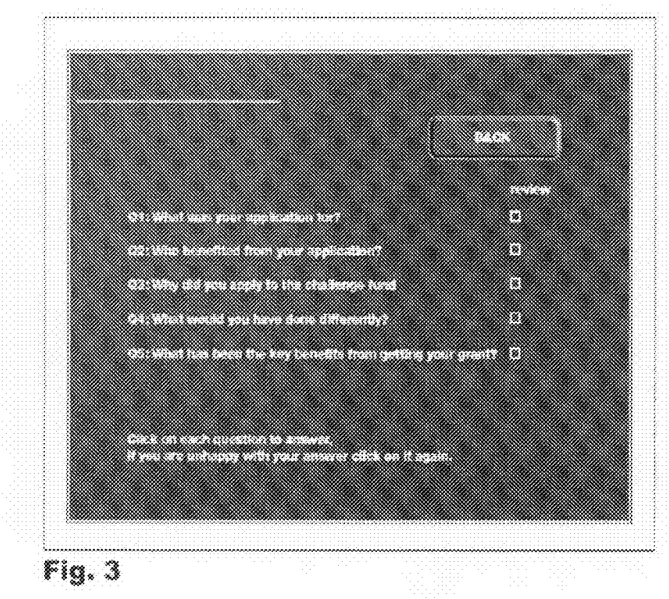
FIG. 3 illustrates a teachers' questions screen.

In FIG. 2, the teacher decides who will be using the system. Different interfaces are provided for each user type; teachers and pupils. Teachers will most likely want sight of all questions they are to be asked before answering any of them, as shown in FIG. 3. The teacher uses the mouse to click a question that they want to answer. A touch screen could be used.

Figure 4:
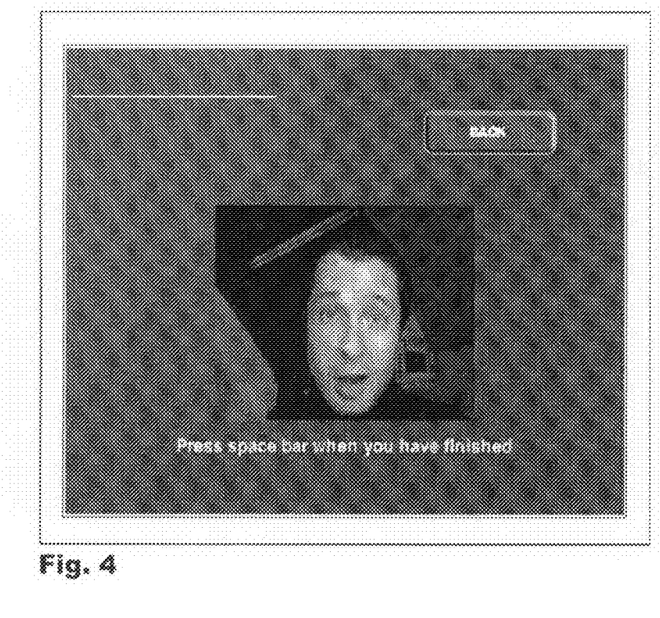
FIG. 4 illustrates a teachers' answer recording screen.

This then takes them to another screen where the recording starts immediately, as shown in FIG. 4. While the recording is taking place, there is a live clip displayed on screen of the teacher answering the question, and the text on the screen tells them to press the spacebar to stop recording. When the teacher presses the spacebar, the recording stops and the program returns to the screen with the questions as shown in FIG. 3. The teacher is then able to click on a different question to answer it. If they click on the same question again, they will record over their previous answer. Buttons (not shown) may be provided for the user to review clips already recorded.

When they have answered all questions to their satisfaction, they can click on the back button to return to the main menu screen of FIG. 2, with 'teacher' and 'pupil' buttons.

Figure 5:
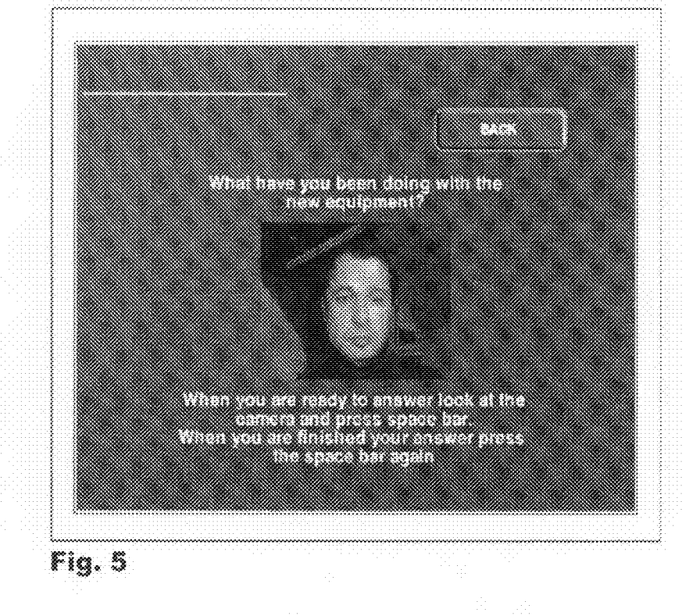
FIG. 5 illustrates a pupils' question screen.

If the option for a pupil interface is selected at the screen of FIG. 2, pupils are taken through each of the questions one at a time using the pupil interface as shown in FIG. 5. Here, questions are displayed above the video screen and are read out by the computer's voice synthesizer. The pupil can hit the space bar to begin recording.

Figure 6:
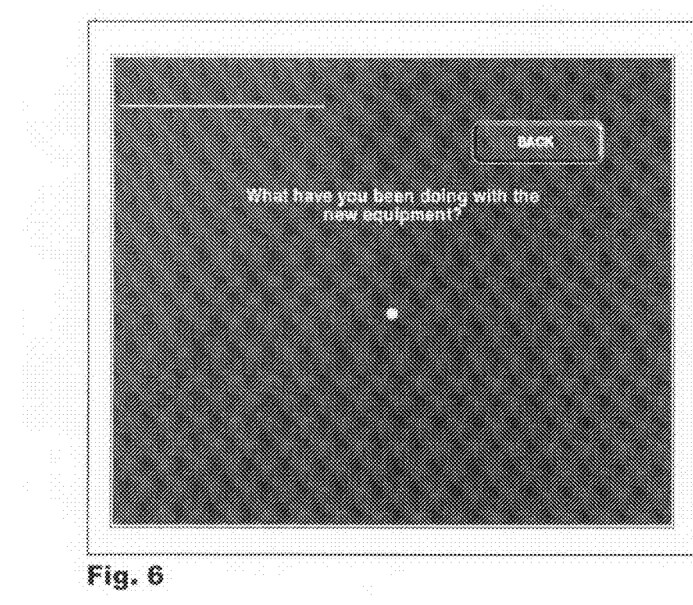
FIG. 6 illustrates a pupils' countdown to recording screen.
Figure 7:
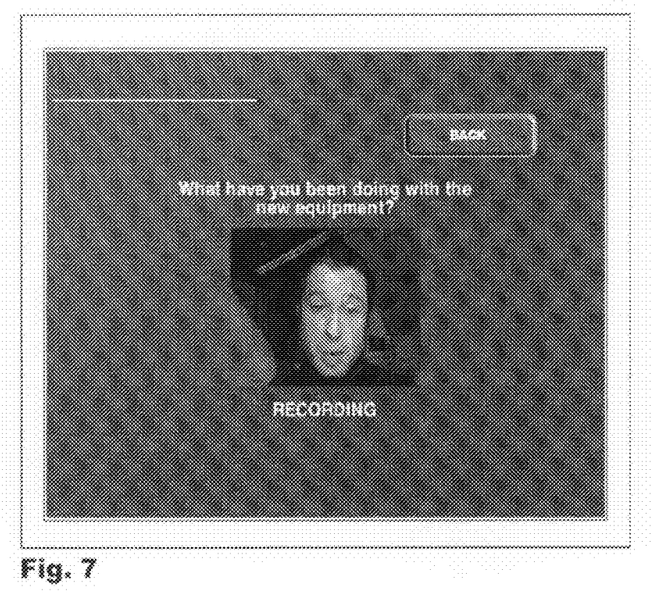
FIG. 7 illustrates a pupils' answer recording screen.

Pressing the spacebar displays a countdown on screen, as shown in FIG. 6, with three dots audibly represented by beeps, reducing one by one. This is to prepare the pupil for the start of the recording process. After the last dot disappears the pupil is taken to the recording screen shown in FIG. 7. Here the question is still displayed above the video. The clip in the video is the live recording, and the word 'RECORDING' is on screen below the video. The pupil can hit the space bar to end recording and progress to the next question. Alternatively a time limit can be set on answers, of say 40 seconds. When the pupil has answered all the questions, the text on the screen (not shown) instructs them to send in the next person.

The stored video clips and associated related prompt data are sent back to a central hub or server for editing. The editing process is described below with reference to FIGS. 8 to 10.

Figure 8:
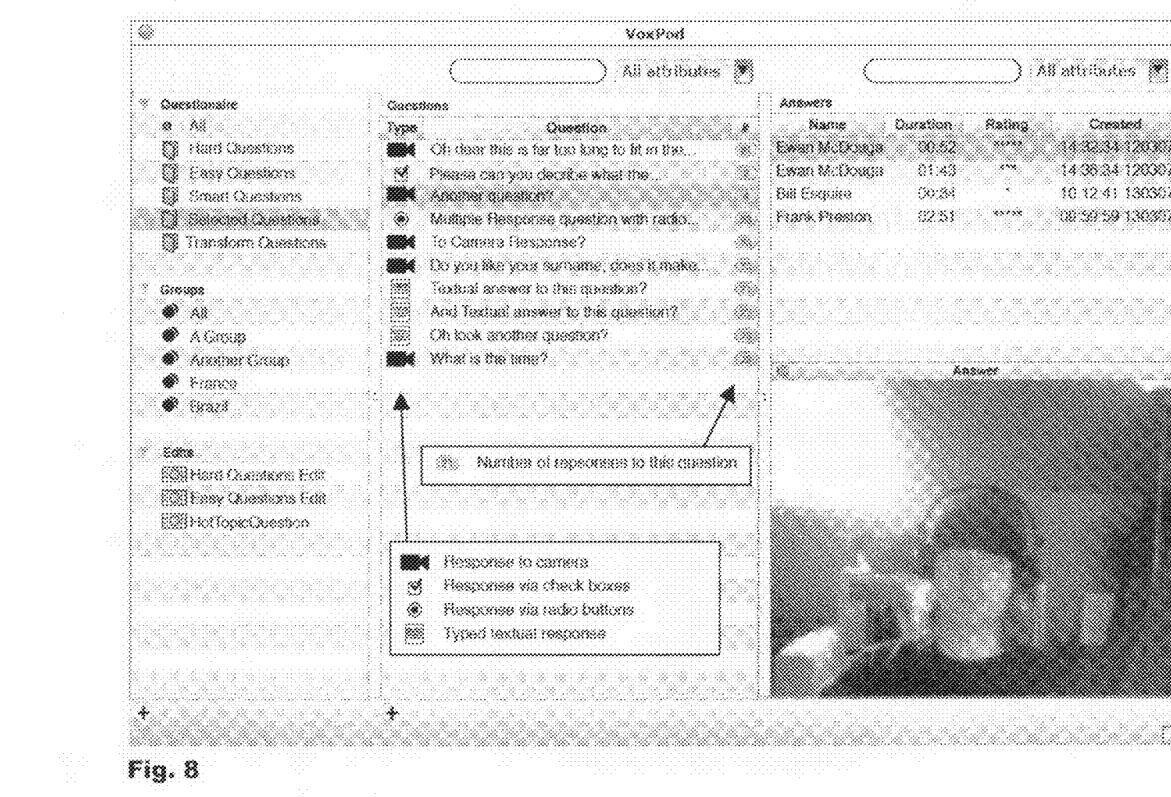
FIG. 8 illustrates a screen of software used to prepare questionnaire scripts and list the answers.

FIG. 8 shows a screen grab of the software application used to prepare questionnaire scripts and edit the answers into a video clip sequence. The interface is structured into 3 columns. The left hand column is the main column. It contains high level groupings, 'Questionnaire', 'Groups' and 'Edits'. A Questionnaire is a group of Questions. A Group is a group of Members. An Edit is group of Questionnaires and Groups. In this example, the Questionnaire 'Selected Questions' has been selected in the main column.

The middle column is a table view, the contents of which change depending on which main-column grouping, 'Questionnaire', 'Groups' and 'Edits', is selected. In this case, the middle column lists ten Questions that make up the 'Selected Questions' Questionnaire. The third question down in the list, that is 'Another question?', has been selected in the middle column. Each question has an icon depicting the type of response to be captured. The types are: Response to camera, Response via check boxes, Response via radio button and Typed textual response. Therefore, in addition to the camera and video storage for recording video clips, other input devices can be used, in this case a keyboard and mouse. There are different kinds of data that can be captured and stored so as to be related to the prompt. This data can include for example sound recordings using a microphone or geographical location using a GPS (Global Positioning System) receiver.

The right column displays the four responses to camera that have been recorded as video clips in answer to the Question 'Another question?'. The user identifier (name) of each user is shown next to the duration, rating and creation time of each clip. The video panel at the bottom of the right column shows one particular video clip that has been selected, in this case the first in the list.

Figure 9:
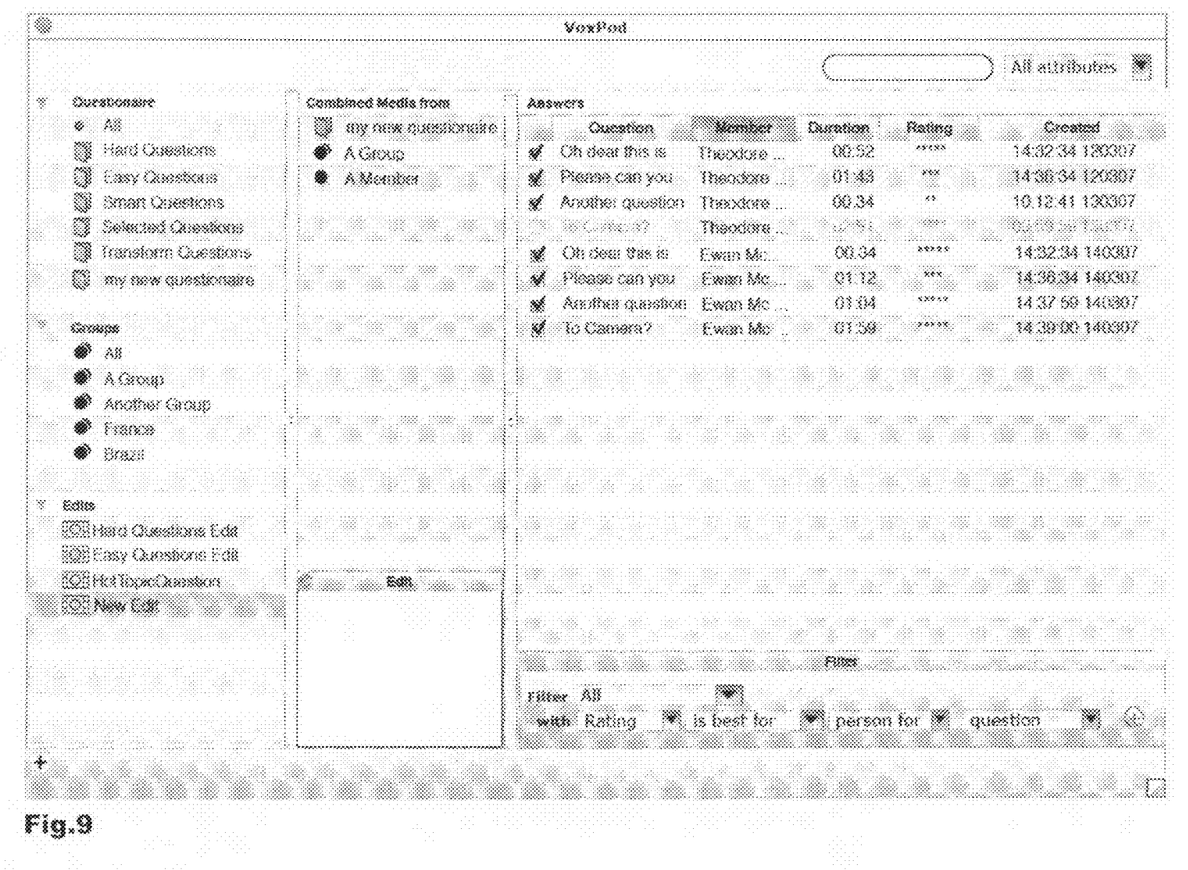
FIG. 9 illustrates a screen used to edit the answers into a video clip sequence.

With reference to FIG. 9, an edit is created by clicking the + button or selecting File->New Edit from the Main Menu. In its simplest form, an edit is essentially a series of ordered answers. Having collected non-video responses, the Edit window at the bottom of the middle column does not just display video responses but also can display their multimedia responses individually, still images, graphs and textual information in a suitable format. In addition to Questionnaire, Groups and Edits there may be a Statistics group (not shown).

Questionnaires, Groups, Questions and Members can be added to an Edit by dragging and dropping the relevant Questionnaire, Group or Questions onto the Edit.

The answers contained within these Questionnaires, Questions, Groups and Members can then be filtered via the filter panel at the bottom right of the column. Thus the video panel (titled 'Edit') has moved to the mid column to make room for the 'Filter' panel in the right hand column.

Answers (video clips) which have been filtered out do not appear in the right hand answers column. Answers can also be unchecked so they are not included in the edit (e.g. the $4^{th}$ answer down on the list). 'New Edit' has been ordered here by member, so the answers appear ordered by member. This is how the videos in sequence appear in the edit. The answers can also be manually ordered by dragging and dropping them.

An edit can be exported for example as a single movie file, as a Final Cut Pro™ edit file or other formats.

Figure 10:
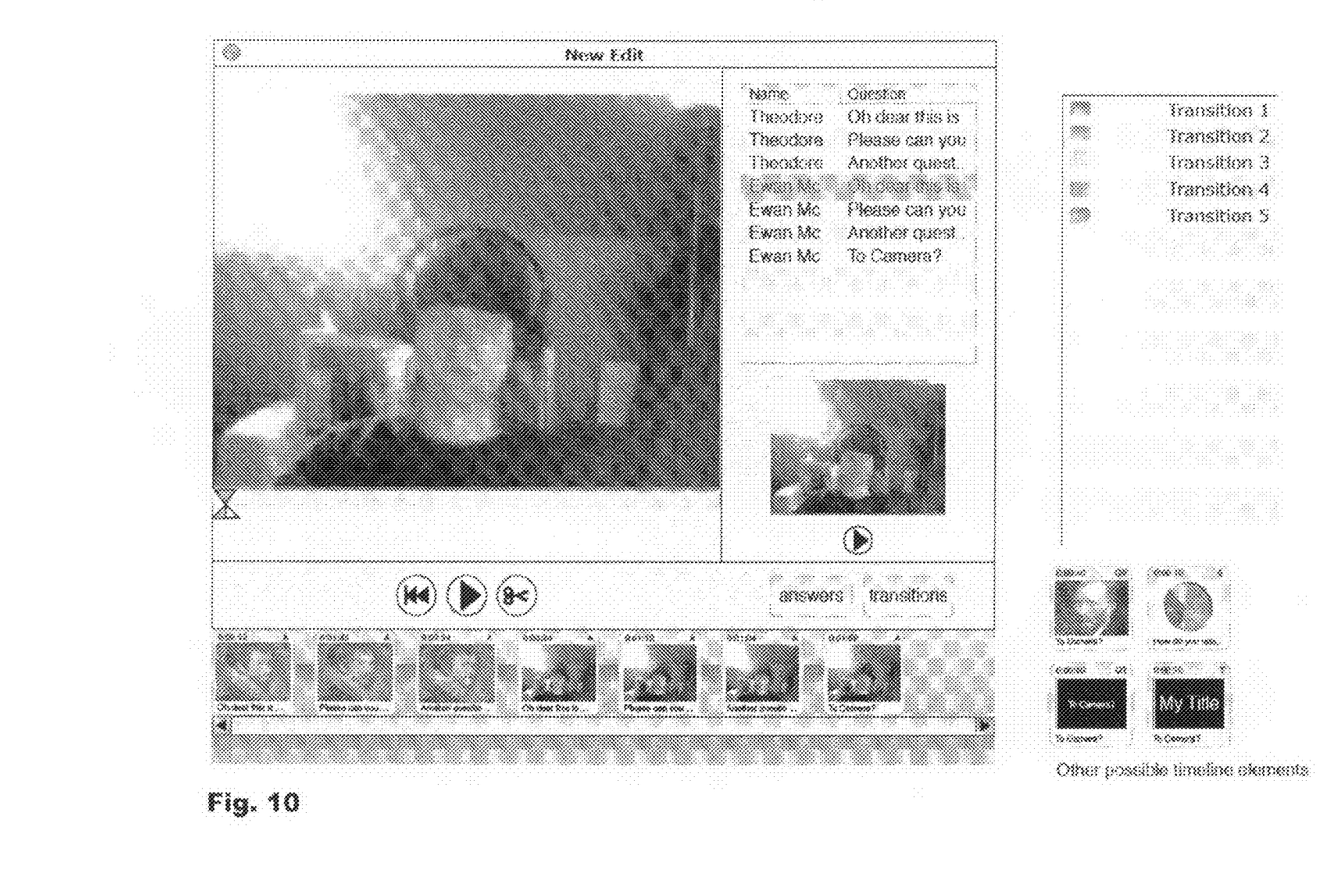
FIG. 10 illustrates a screen used to edit the video clip sequence.

The Edit Window shown in FIG. 10 can be opened by double clicking an Edit in the main view of FIG. 8. The Edit Window consists of a number of elements, the edit playback panel displays the video and is the largest panel; the timeline panel is a simple single linear layer in which answers are sequential placed interspersed with transitions; the edit elements panel to the right of the video panel is a tabbed panel containing elements that can be placed on the timeline.

The edit playback panel displays the edit or selected edit element at the point of timeline indicated by the playback head shown. In the three triangle icon at the base of the video window, the top is the playback head. At the bottom are the in and out point markers. Clicking the triangle play icon starts playback of the edit. The playhead starts from the current location. Clicking on the rewind icon goes to the start of the edit. The scissor icon is used to trim the currently selected edit or edit element to the in and out points (this is non-destructive).

As mentioned above, the edit element panel is tabbed. The New Edit window shows the edit element panel answers panel. Beside that, but to the right of the New Edit window, the transition panel is shown. This panel is displayed in the edit window when the 'transitions' button is pressed. It contains all the transitions that can be added to the edit. To add an transition the user can drag and drop a transition from the transitions panel to the timeline panel and place it between the desired edit elements.

The timeline panel at bottom right of FIG. 10 shows a row of edit elements, answers and transitions. This edit was automatically generated via the choices the user made in the main window of FIG. 8. Other possible edit elements are questions, titles and statistics generated from the quantitative responses e.g. checkboxes.

The script may further comprise predefined behaviours. The behaviour may be applied to the capture of the media clip or other asset prior to or during the capture. The behaviour may be control of the environment, for example the script may contain instructions to control devices to change the lighting or operate fans. The script may support a range of hardware device control protocols programmed using the pre-defined scripts. The script may comprise a behaviour that when applied controls the duration of a clip.

The behaviour may comprise performance coaching such as exercises to prepare a user for the recording.

The behaviour may be applied to the captured media clip or other asset during or after its capture. The behaviour may comprise manipulation of the asset including but not limited to applying effects, filters, and transformations. The behaviour may also control the editing of the captured assets.

The behaviour may comprise tagging of the captured asset or classification of it. This aids the filtering of a large number of captured assets during editing.

Also the behaviour may comprise quality control of the captured asset. For example, after a clip is recorded it may be analysed using pre-defined criteria and the clip is accepted or rejected (and re-recorded) based on the quality control' behaviour.

Further modifications and improvements may be added without departing from the scope of the invention herein described.

The invention claimed is:

1. A media capture apparatus comprising:
 a script storage module adapted to store a script, the script comprising a plurality of discrete prompts;
 a script presenting module adapted to present a plurality of discrete prompts to a user;
 a media capture module adapted for the user to capture a plurality of prompted media assets, each prompted media asset corresponding to at least one discrete prompt of the plurality of discrete prompts; and
 an asset storage module adapted to store each captured prompted media asset so as to be related to its corresponding at least one discrete prompt;
 wherein the media capture module comprises a media recorder adapted to record a plurality of prompted media clips, each prompted media clip corresponding to at least one discrete prompt of the plurality of discrete prompts;
 the asset storage module comprises a clip storage module adapted to store each recorded prompted media clip so as to be related to its corresponding at least one discrete prompt; and
 wherein said media capture apparatus further comprises an editing module adapted to edit at least some of the captured prompted media assets into a media sequence using the relationship between each captured prompted media asset and its corresponding at least one discrete prompt; wherein the editing module is further adapted to automatically edit the captured prompted media assets into a media sequence; and wherein the editing module is further adapted to automatically edit the captured prompted media assets into a media sequence that is non-sequential with respect to the order of the presentation of the discrete prompts.

2. The media capture apparatus of claim 1 further comprising a script receiving module adapted to receive the script.

3. The media capture apparatus of claim 1 wherein the script comprises a questionnaire and the prompts comprise questions.

4. The media capture apparatus of claim 1 wherein the script presenting module is further adapted to present the plurality of discrete prompts one at a time.

5. The media capture apparatus of claim 1 wherein the script presenting module is further adapted to present a set of the plurality of discrete prompts at the same time.

6. The media capture apparatus of claim 1 wherein the media capture module is operable to capture at least one of the plurality of prompted media assets responsive to a user input.

7. The media capture apparatus of claim 6 wherein the user input comprises the user selecting a prompt from a plurality of presented prompts.

8. The media capture apparatus of claim 1 wherein the script further comprises a user identifier and the asset storage module is further adapted to store each captured prompted media asset so as to be related to its corresponding user identifier.

9. The media capture apparatus of claim 8 wherein the user identifier comprises a user name.

10. The media capture apparatus of claim 8 wherein the user identifier comprises a use group.

11. The media capture apparatus of claim 8 wherein the editing module is further adapted to edit at least some of the captured prompted media assets into a media sequence using the user identifier.

12. The media capture apparatus of claim 8 wherein the editing module is further to edit the captured prompted media assets from a plurality of the media capture apparatuses into a media sequence.

13. The media capture apparatus of claim 1 wherein the media recorder comprises a video camera.

14. The media capture apparatus of claim 1 wherein the script further comprises a predefined behaviour.

15. The media capture apparatus of claim 14 wherein the behaviour is applied to the capture of the prompted captured asset.

16. The media capture apparatus of claim 15 wherein the behaviour is applied prior to the capture of the prompted captured asset.

17. The media capture apparatus of claim 15 wherein the behaviour is applied during the capture of the prompted captured asset.

18. The media capture apparatus of claim 15 wherein the behaviour comprises control of the environment local to the capture.

19. The media capture apparatus of claim 15 wherein the behaviour comprises performance coaching.

20. The media capture apparatus of claim 14 wherein the behaviour is applied to the prompted captured asset.

21. The media capture apparatus of claim 20 wherein the behaviour is applied to the prompted captured asset after its capture.

22. The media capture apparatus of claim 20 wherein the behaviour comprises manipulation of the prompted captured asset.

23. The media capture apparatus of claim 20 wherein the behaviour comprises tagging of the prompted captured asset.

24. The media capture apparatus of claim 20 wherein the behaviour comprises quality control of the prompted captured asset.

25. The media capture apparatus of claim 20 wherein the behaviour comprises classification of the prompted captured asset.

26. The media capture apparatus of claim 14 wherein the behaviour comprises control of the editing by the editing module.

27. The media capture apparatus of claim 1 wherein the script comprises a template for a movie.

28. The media capture apparatus of claim 1 wherein the prompt comprises a visual storyboard.

29. The media capture apparatus of claim 1 wherein the prompt comprises director's audio guidance.

30. The media capture apparatus of claim 1 wherein the prompt comprises lines of dialogue.

31. The media capture apparatus of claim 1 wherein the script comprises non-user generated content selected from a list comprising titles, sound effects, narrative, background music and whole scenes.

32. The media capture apparatus of claim 1 wherein the script comprises a link or pointer to other content.

33. A camera comprising the media capture apparatus of claim 1.

34. A self interview kit comprising the media capture apparatus of claim 1.

35. A non-transitory computer-readable medium comprising program instructions configured to operate a device as the media capture apparatus of claim 1.

36. A cell phone comprising a media capture apparatus, said media capture apparatus comprising:
a script storage module adapted to store a script, the script comprising a plurality of discrete prompts;
a script presenting module adapted to present a plurality of discrete prompts to a user;
a media capture module adapted for the user to capture a plurality of prompted media assets, each prompted media asset corresponding to at least one discrete prompt of the plurality of discrete prompts; and
an asset storage module adapted to store each captured prompted media asset so as to be related to its corresponding at least one discrete prompt; wherein:
the media capture module comprises a media recorder adapted to record a plurality of prompted media clips, each prompted media clip corresponding to at least one discrete prompt of the plurality of discrete prompts;
the asset storage module comprises a clip storage module adapted to store each recorded prompted media clip so as to be related to its corresponding at least one discrete prompt; and
said media capture apparatus further comprises an editing module adapted to edit at least some of the captured prompted media assets into a media sequence using the relationship between each captured prompted media asset and its corresponding at least one discrete prompt, the editing module is further adapted to automatically edit the captured prompted media assets into a media sequence, and the editing module is further adapted to automatically edit the captured prompted media assets into a media sequence that is non-sequential with respect to the order of the presentation of the discrete prompts.

* * * * *

UNITED STATES PATENT AND TRADEMARK OFFICE
CERTIFICATE OF CORRECTION

PATENT NO.         : 8,621,354 B2                                                Page 1 of 1
APPLICATION NO.    : 12/666439
DATED              : December 31, 2013
INVENTOR(S)        : Henderson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 899 days.

Signed and Sealed this

Twenty-second Day of September, 2015

Michelle K. Lee
*Director of the United States Patent and Trademark Office*